United States Patent
Lansell et al.

(10) Patent No.: US 10,427,129 B2
(45) Date of Patent: Oct. 1, 2019

(54) SYSTEMS AND METHODS FOR FACILITATING REACTIONS IN GASES USING SHOCKWAVES PRODUCED IN A SUPERSONIC GASEOUS VORTEX

(71) Applicant: LLT International (Ireland) Ltd., Dublin (IE)

(72) Inventors: Peter Lansell, Kew (AU); William Keating, Fairfield (AU); David Lowe, Alphington (AU)

(73) Assignee: LLT INTERNATIONAL (IRELAND) LTD., Dublin (IE)

( * ) Notice: Subject to any disclaimer, the term of this patent is extended or adjusted under 35 U.S.C. 154(b) by 0 days.

(21) Appl. No.: 14/690,149

(22) Filed: Apr. 17, 2015

(65) Prior Publication Data
US 2016/0303539 A1    Oct. 20, 2016

(51) Int. Cl.
*B01J 3/00* (2006.01)
*B01J 3/08* (2006.01)
(Continued)

(52) U.S. Cl.
CPC ............... *B01J 19/10* (2013.01); *B01J 3/008* (2013.01); *B01J 3/08* (2013.01); *B01J 4/002* (2013.01);
(Continued)

(58) Field of Classification Search
CPC ............. B01J 19/10; B01J 2219/08; B01J 2219/0871; B01J 3/08; B01J 4/002;
(Continued)

(56) References Cited

U.S. PATENT DOCUMENTS 2,257,907 A    10/1941  Griswold ................ 252/291
2,532,554 A *  12/1950  Joeck .................. B01J 19/10
                                                116/137 A
(Continued)

FOREIGN PATENT DOCUMENTS

CN        103249667 A       8/2013
DE    102013019949 A1 *    5/2015  ............. B01J 19/10
(Continued)

OTHER PUBLICATIONS

Derwent abstract of DE 102013019949 A1.*
(Continued)

*Primary Examiner* — Nicholas A Smith
*Assistant Examiner* — Colleen M Raphael
(74) *Attorney, Agent, or Firm* — Pillsbury Winthrop Shaw Pittman LLP (57) ABSTRACT

A gas reactor system may be configured for facilitating chemical reactions of gases using shockwaves produced in a supersonic gaseous vortex. The system may include a gas source to provide a gas to a heater and/or a reactor. The reactor may be configured to facilitate chemical reactions of gases using shockwaves created in a supersonic gaseous vortex. The reactor may be arranged with a gas inlet to introduce a high-velocity steam of gas into a chamber of the reactor. The gas inlet may effectuate a vortex of supersonic circulating gas within the chamber. The vortex may rotate at supersonic speed about the longitudinal axis of the chamber. The system may be configured to store an output product of the reactor in a storage tank in fluid communication with the reactor.

22 Claims, 8 Drawing Sheets

(51) Int. Cl.
  *B01J 4/00* (2006.01)
  *B01J 19/10* (2006.01)
  *B01J 19/12* (2006.01)

(52) U.S. Cl.
  CPC ........... *B01J 19/126* (2013.01); *B01J 19/129* (2013.01); *B01J 2219/08* (2013.01); *B01J 2219/0871* (2013.01); *B01J 2219/0892* (2013.01)

(58) Field of Classification Search
  CPC .............. B01J 2219/0892; B01J 19/126; B01J 19/129; B01J 3/008
  USPC ............. 204/157.15; 422/127–128, 186–187
  See application file for complete search history.

(56) References Cited

U.S. PATENT DOCUMENTS

| | | | |
|---|---|---|---|
| 2,752,097 A | 6/1956 | Lecher | |
| 2,997,245 A | 8/1961 | Nilsson et al. | |
| 3,178,121 A | 4/1965 | Wallace, Jr. | 241/5 |
| 3,254,848 A | 6/1966 | Stephanoff | 241/39 |
| 3,257,080 A | 6/1966 | Snyder | 241/5 |
| 3,301,292 A | 1/1967 | O'Connor | 146/221.5 |
| 3,348,814 A * | 10/1967 | Shaw | B01F 11/0283 422/127 |
| 3,462,086 A | 8/1969 | Bertrand et al. | 241/5 |
| 3,565,348 A | 2/1971 | Dickerson et al. | 241/5 |
| 3,602,439 A | 8/1971 | Nakayama | 241/39 |
| 3,620,946 A * | 11/1971 | Denis | B01J 19/10 422/186.23 |
| 3,908,904 A * | 9/1975 | Kerner | B01J 19/10 239/4 |
| 4,198,004 A | 4/1980 | Albus et al. | 241/39 |
| 4,248,387 A | 2/1981 | Andrews | 241/5 |
| 4,354,641 A | 10/1982 | Smith | |
| 4,504,017 A | 3/1985 | Andrews | |
| 4,515,093 A | 5/1985 | Beardmore et al. | 110/347 |
| 4,671,192 A | 6/1987 | Hoffert et al. | 110/347 |
| 4,919,853 A | 4/1990 | Alvarez et al. | |
| 4,921,173 A | 5/1990 | Bartley | |
| 5,219,530 A * | 6/1993 | Hertzberg | G10K 15/043 208/128 |
| 5,246,575 A | 9/1993 | Alexander | |
| 5,277,369 A | 1/1994 | Moriya et al. | |
| 5,306,330 A | 4/1994 | Nasikas | |
| 5,855,326 A | 1/1999 | Beliaysky | 241/5 |
| 6,089,026 A | 7/2000 | Hu | |
| 6,145,765 A | 11/2000 | Capelle, Jr. et al. | 241/5 |
| 6,152,158 A | 11/2000 | Hu | |
| 6,158,676 A | 12/2000 | Hughes | |
| 6,167,323 A | 12/2000 | Komino et al. | |
| 6,824,086 B1 | 11/2004 | Mazurkiewicz et al. | |
| 7,137,580 B2 | 11/2006 | Graham et al. | 241/1 |
| 7,258,290 B2 | 8/2007 | Taketomi et al. | |
| 7,398,934 B1 | 7/2008 | Capelle, Jr. | 241/5 |
| 7,621,473 B2 | 11/2009 | Capelle, Jr. | 241/5 |
| 7,789,331 B2 | 9/2010 | Zehavi et al. | 241/5 |
| 7,850,105 B2 | 12/2010 | Ito et al. | 241/39 |
| 8,172,163 B2 | 5/2012 | Soliman Abdalla et al. | 241/1 |
| 8,398,007 B2 | 3/2013 | Ito et al. | 241/39 |
| 8,480,859 B2 | 7/2013 | Kostrov et al. | 196/14.52 |
| 8,726,532 B2 | 5/2014 | Hogan | |
| 9,050,604 B1 | 6/2015 | Lansell et al. | |
| 9,452,434 B1 | 9/2016 | Lansell et al. | |
| 2004/0063874 A1 | 4/2004 | Muhle et al. | |
| 2004/0200910 A1 | 10/2004 | Graham et al. | 241/5 |
| 2006/0144760 A1 | 7/2006 | Duyvesteyn | |
| 2007/0267527 A1 | 11/2007 | Graham et al. | 241/39 |
| 2008/0226535 A1 | 9/2008 | Park et al. | 423/447.3 |
| 2009/0241816 A1 | 10/2009 | Taylor | |
| 2010/0025506 A1 | 2/2010 | Capelle, Jr. | |
| 2010/0101978 A1 * | 4/2010 | Gordon | B01J 19/087 208/49 |
| 2011/0206593 A1 | 8/2011 | Fahs, II et al. | 423/351 |
| 2011/0283705 A1 | 11/2011 | Oliver | |
| 2011/0303013 A1 | 12/2011 | Kass et al. | |
| 2012/0055285 A1 * | 3/2012 | Mercuri | B01J 19/26 422/187 |
| 2012/0103098 A1 * | 5/2012 | Laugharn, Jr. | B01J 19/006 73/644 |
| 2012/0131901 A1 | 5/2012 | Westervelt et al. | |
| 2012/0230877 A1 | 9/2012 | Pinchot | 422/128 |
| 2013/0221141 A1 | 8/2013 | Zhang et al. | |
| 2013/0224488 A1 * | 8/2013 | Dos Santos Antunes | B01J 3/08 428/402 |
| 2013/0309161 A1 | 11/2013 | Akay | |
| 2013/0315792 A1 | 11/2013 | O'Dowd | |
| 2013/0336845 A1 | 12/2013 | Chu | 422/128 |
| 2014/0058095 A1 * | 2/2014 | Rende | B01J 19/10 540/485 |
| 2014/0058156 A1 * | 2/2014 | Bricker | B01J 19/10 585/325 |
| 2014/0058158 A1 * | 2/2014 | Bedard | B01J 19/10 422/128 |
| 2014/0058159 A1 * | 2/2014 | Bedard | B01J 19/10 422/128 |
| 2014/0058160 A1 * | 2/2014 | Bedard | B01J 19/10 422/128 |
| 2014/0058163 A1 * | 2/2014 | Towler | B01J 19/10 585/539 |
| 2014/0058164 A1 * | 2/2014 | Towler | B01J 19/10 585/539 |
| 2014/0058165 A1 | 2/2014 | Bedard et al. | |
| 2014/0058170 A1 | 2/2014 | Bedard | |
| 2014/0058178 A1 | 2/2014 | Bedard et al. | |
| 2014/0110307 A1 * | 4/2014 | Salazar-Guillen | B01J 19/26 422/128 |
| 2014/0121346 A1 * | 5/2014 | Tang | B01J 19/10 422/128 |
| 2014/0275687 A1 * | 9/2014 | Beene | B01J 19/10 585/717 |
| 2015/0165414 A1 * | 6/2015 | Gattupalli | B01J 19/10 422/128 |
| 2015/0352558 A1 * | 12/2015 | Lansell | B01J 19/10 241/1 |
| 2015/0361010 A1 * | 12/2015 | Leonard | B01J 19/26 422/128 |
| 2016/0030856 A1 * | 2/2016 | Kaplan | C10G 7/06 422/187 |
| 2016/0045841 A1 * | 2/2016 | Kaplan | B01J 19/24 422/129 |
| 2016/0243488 A1 * | 8/2016 | Wells | F01N 3/043 |
| 2016/0296904 A1 | 10/2016 | Knowles | |
| 2017/0253492 A1 | 9/2017 | Beach et al. | |

FOREIGN PATENT DOCUMENTS

| | | |
|---|---|---|
| EA | 000004 | 9/1997 |
| FR | 1048667 | 12/1953 |
| GB | 1037770 | 8/1966 |
| RU | 2 029 621 | 2/1995 |
| RU | 2520 U1 | 8/1996 |
| RU | 2 088 336 | 8/1997 |
| WO | WO 94/08719 | 4/1994 |
| WO | 97/33695 | 9/1997 |
| WO | WO 97/33695 | 9/1997 |
| WO | 2006/067636 A2 | 6/2006 |
| WO | 2008/083138 | 7/2008 |
| WO | 2009/073447 A2 | 6/2009 |
| WO | 2014/210297 A1 | 12/2014 |
| WO | 2015/053857 A2 | 4/2015 |

OTHER PUBLICATIONS

Demare, D., et al., "Acoustic enhancement of combustion in lifted non-remixed jet flames", The Combusion Institute, 139 (2004), 312-328, Elsevier, Inc.

(56) References Cited

OTHER PUBLICATIONS

Simpson, E., et al., Acoustic Performance of a Cylindrical Disk-Type Resonator, Journal of Sound and Vibration, (1978) 60(1), 151-156, Academic Press Inc. (London) Limited.
Narayanan, S., et al. "Acoustic characteristics of chamfered Hartmann whistles", Journal of Sound and Vibration, 330 (2011) 2470-2496, Elsevier, Ltd.
Narayanan, S. et al., Aero-acoustic features of internal and external chamfered Hartmann whistles: A comparative study, Journal of Sound and Vibration, 333 (2014) 774-787, Elsevier, Ltd.
International Preliminary Report on Patentability and the Written Opinion of the International Searching Authority as issued in International Patent Application No. PCT/US2015/034554, dated Sep. 3, 2015.
International Preliminary Report on Patentability and the Written Opinion of the International Searching Authority as issued in International Patent Application No. PCT/US2015/034548, dated Sep. 8, 2015.
Hartmann, J. et al, "Synchronisation of Air-Jet Generators with an Appendix on the Stem Generator", Det Kgl. Danske Videnskabernes Selskab. Matematisk-fysiske Meddelelser, Bd. 26, No. 10, 1951(39 pages).
English machine translation for FR 1048667 A (Dec. 1953).
English machine translation for WO 97/33695 A1 (Sep. 1997), translated by Schreiber Translations, Inc. Mar. 2015.
International Search Report and Written Opinion dated Sep. 26, 2016 in corresponding International Patent Application No. PCT/US2016/046641.
Final Office Action dated Dec. 6, 2016 in corresponding U.S. Appl. No. 14/298,877 (10 pages).
M. Reader-Harris, Orifice Plates and Venturi Tubes, Chapter 3: Venturi Tube Design, 2015, pp. 77-96.
Non-Final Office Action dated Jul. 21, 2016 in corresponding U.S. Appl. No. 14/823,890 (13 pages).
Final Office Action dated Dec. 29, 2016 in corresponding U.S. Appl. No. 14/823,890 (14 pages).
International Preliminary Report on Patentability PCT/US2016/028167 dated Oct. 17, 2017.
International Preliminary Report on Patentability PCT/US2016/028181 dated Oct. 17, 2017.
International Preliminary Report on Patentability PCT/US2016/046641 dated Feb. 13, 2018.
Non-final Office Action U.S. Appl. No. 14/823,890 dated Jan. 29, 2018.
Details of the First Office Action Chinese Patent Application No. 201680035572.0 dated Jul. 24, 2018 with English translation.
Final Office Action U.S. Appl. No. 14/823,890 dated Sep. 4, 2018.
Notice of Allowance U.S. Appl. No. 14/719,303 dated Jul. 25, 2018.
Extended European Search Report dated Dec. 13, 2018 in related European Patent Application No. 16781030.8, 10 pages.
Non-Final Office Action dated Jan. 10, 2019 in related U.S. Appl. No. 15/277,975, 10 pages.
Decision to grant dated Jan. 15, 2019 in related Chinese Patent Application No. 201680035572.0, 4 pages.
Notice of Allowance dated Jan. 11, 2019 in related U.S. Appl. No. 14/823,890, 8 pages.
Final Office Action dated May 3, 2019 in related U.S. Appl. No. 15/277,975, 16 pages.
Notice of Grant dated Apr. 10, 2019 in related Kazakstani Patent Application No. 2017/1058.1, 14 pages.

* cited by examiner

SYSTEMS AND METHODS FOR FACILITATING REACTIONS IN GASES USING SHOCKWAVES PRODUCED IN A SUPERSONIC GASEOUS VORTEX

FIELD OF THE DISCLOSURE

The disclosure relates to systems and methods for facilitating reactions in gases using shockwaves produced in a supersonic gaseous vortex.

BACKGROUND

Conventional approaches to facilitating gaseous reactions typically may include high temperature reaction chambers. However, these reaction chambers may often be limited in the reactions they can facilitate by the heat and pressure conditions they can provide. Because the conventional approaches may be limited to providing reactants at approximately the same temperature or pressure in the reaction chamber, some reactions may not be possible.

SUMMARY

Exemplary implementations may facilitate reaction conditions that may not be possible with conventional approaches. Shockwaves introduced into a supersonic gaseous vortex may provide extreme pressure and temperature transitions that catalyze desired reactions. The vortex rotating at supersonic speeds may enable endothermic or exothermic reactions, which may not be possible using existing reaction chambers.

One aspect of the disclosure relates to a system configured for facilitating reactions in gases using shockwaves produced in a supersonic gaseous vortex. The system may comprise a gas source, a heater, a reactor, and a storage tank. The gas source may be configured to provide one or more gases to the system. The heater may be configured to receive the gas from the gas source, and increase the temperature and pressure of the gas. The reactor may be configured to facilitate chemical reactions of gases using shockwaves created in a supersonic gaseous vortex. The reactor may comprise a rigid chamber having a substantially circular cross-section centered on a longitudinal axis that is normal to the cross-section. The reactor may comprise a gas inlet configured to introduce the high-velocity stream of a gas into the chamber. The gas inlet may be disposed and arranged so as to effectuate a vortex of the stream of gas circulating within the chamber. The gas inlet may have a variety of means for inducing sonic pulses or resonance into the gas stream. The vortex may rotate at a supersonic speed about the longitudinal axis of the chamber. The reactor may comprise an outlet configured to emit output product from the chamber. The reactor and/or the operating conditions of the reactor may be configured to facilitate extremely high centripetal accelerations and/or "G" forces within the chamber. The centripetal accelerations and/or "G" forces may result in very high pressures being created in the gases at the periphery of the reactor. The outlet may be disposed at an opposite end of the chamber as the gas inlet. The storage tank may be configured to store the output product of the reactor. The storage tank may be in fluid communication with the outlet of the reactor.

Another aspect of the disclosure relates to a method for facilitating reactions in gases using shockwaves providing a supersonic gaseous vortex. In some implementations, the method may include providing one or more gases to the system. In some implementations, the method may include increasing the temperature and pressure of the gas. In some implementations, the introduction of the gas to the reactor may create a supersonic gaseous vortex and catalyze chemical reactions of gases by using shockwaves created in a supersonic gaseous vortex. The supersonic gaseous vortex created with shockwaves may be further enhanced by the addition of resonating chambers and/or resonating devices added to the inlet nozzle(s). The resonating chambers may create a high-frequency tone superimposed on the shockwaves emanating from the nozzle due to the supersonic decay in the velocity of the gas stream. The frequency and/or amplitude of the super imposed tone may be chosen to facilitate a desired chemical reaction. The reactor may comprise a rigid chamber having a substantially circular cross-section centered on a longitudinal axis that is normal to the cross-section. The reactor may comprise a gas inlet configured to introduce the high-velocity stream of a gas into the chamber. The gas inlet may be disposed and arranged so as to effectuate a vortex of the stream of gas circulating within the chamber. The vortex may be rotating at a supersonic speed about the longitudinal axis of the chamber. The reactor may comprise an outlet configured to emit output product from the chamber. The reactor outlet may be disposed at an opposite end of the chamber as the gas inlet. The method may comprise storing the output product. The product of the reactor may be solid, liquid, and/or gas.

In another implementation, the gases may be arranged to impinge on a continuously replaceable catalytic surface. This device hereinafter is called an "impactor." The impactor may be made of catalytic material which is designed to facilitate a desired chemical reaction. This impactor may be insulated from the body of the reactor such that a variable voltage, amperage, frequency, and/or waveform may be applied to the impactor to facilitate desired chemical reactions. This electrical assistance of catalytic activity is generically called Non Faradic Electrochemical Modification of Chemical Activity (NEMCA). NEMCA may reduce the "cook off" temperature, that is the temperature at which a particular chemical reaction takes place. NEMCA may increase the rate of reaction many times. NEMCA may facilitate or drive a particular chemical reaction to completion.

The voltages and frequency may be such that a plasma is formed within the reaction chamber. Radio-frequency waves or microwaves may be applied to the reactor to facilitate chemical reactions. Various voltages and frequencies maybe applied to the impactor to create a glow discharge, a travelling wave, and/or other forms of plasma generation.

These and other objects, features, and characteristics of the system, and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
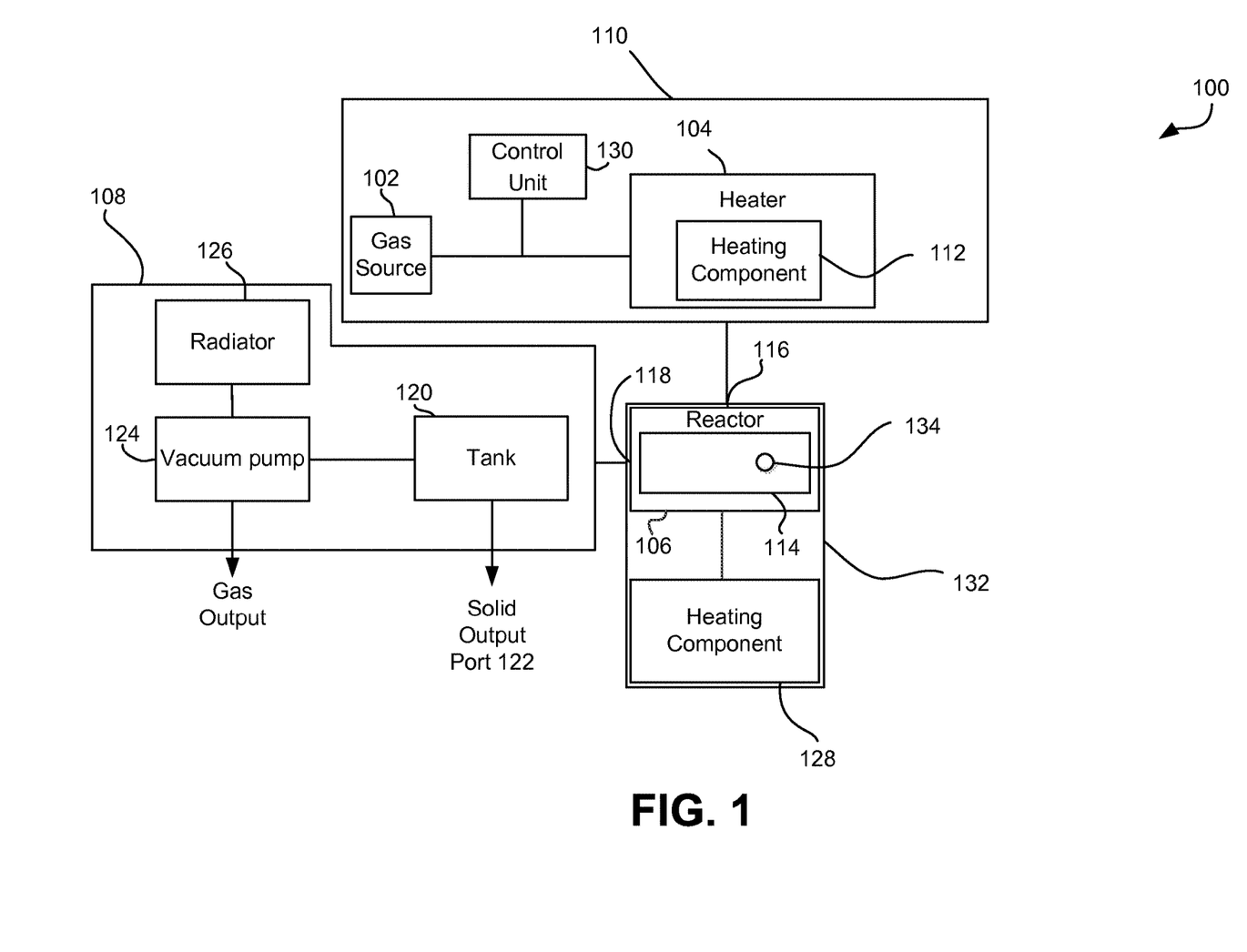
FIG. 1 illustrates a system configured for facilitating reactions in gases using shockwaves produced in a supersonic gaseous vortex, in accordance with one or more implementations.

FIG. 1 illustrates system 100 configured for facilitating reactions in gases using shockwaves produced in a supersonic gaseous vortex, in accordance with one or more implementations. In some implementations, system 100 may include one or more of a gas supply 110, a reactor 106, a storage system 108, and/or other components.

In some implementations, gas supply 110 may include one or more of a gas source 102, heater 104, and/or other components. The gas source 102 may be configured to provide one or more gases to system 100. The gas source 102 may comprise one or more of a gas bottle, a flow generator, a pressurized tank, a pressure swing absorption gas system, a membrane gas separator, a cryogenic gas separator, a gas compressor, and/or other components. In some implementations, gas source 102 may involve a train of reactors configured to facilitate a particular chemical reaction. For example, many chemical reactions may be difficult to perform in one step, necessitating a number of steps to facilitate the particular chemical reaction. The gas introduced to reactor 106 may include a reduced gas. The gas may include one or more of steam, methane, ethane, ethane, propane, butane, pentane, hexane, alkyl isomers, unsaturated hydrocarbons, cycloalkanes, aromatic hydrocarbons, ammonia, hydrogen, hydrogen sulfide, carbon monoxide, carbon dioxide, oxygen, nitrogen, chlorine, fluorine, acetylene, and/or other gases. The gas may include a variety of hydrocarbons, fluorocarbons, chlorinated hydrocarbons, and/or other halogens. The gas may include pre-cursors for carbonyls and/or the production of carbonyls. The system may be configured for the production of insecticides, herbicides, and/or drugs. Hydrogen may be added to an unsaturated hydrocarbon to saturate the hydrocarbon.

The previous examples have been used to exemplify additive reactions but the reactor may be used for disassociation and/or destruction of various gas species. For example, herbicides, insecticides, pharmaceutical drugs, and/or various toxic gases may be disassociated with the reactor.

In some implementations, increasing the temperature and/or pressure of a gas may yield a high velocity stream of that gas. In some implementations, more than one gas may be used to create a supersonic gaseous vortex in the reactor 106. In some implementations, one or more gas sources (e.g., gas source 102) may be used to provide one or more gases to reactor 106. The gas(es) may be supplied to one or more inlets of reactor 106 and may have different velocities, temperatures, pressures, and/or other characteristics. For example, the first gas may enter the reactor at a low temperature and pressure. The second gas may enter the reactor at a high temperature and pressure. In this example, the first gas and the second gas enter the reactor at substantially different temperatures and pressures. In some implementations, additional and/or other gases may be introduced with other different characteristics (e.g. velocity). In some implementations, differences in selection of gas(es) introduced to gas inlet 116 may be utilized to enhance a quality of the reactants, reaction speed, reaction conditions, the product of the reaction and/or other characteristics of the products of the gaseous reaction. In some implementations, a solid maybe introduced to the reactor. The solid may include carbon and/or a metal to which an additive gas is reacted. For example, a metal may be saturated with an additive gas (e.g. hydrogen) which will result in hydrides of that metal. A metal may be reacted in combination with carbon monoxide to produce carbonyls. Carbon, for example, may be reacted with methane to result in a large percentage of acetylene in the output gas. Other examples will be obvious to those skilled in the art.

In some implementations, heater 104 may comprise one or more heating components 112 and/or other components. The heater 104 may be configured to receive gas from gas source 102. The heating component(s) 112 may be configured to increase a temperature and pressure of gas within heater 104. The heater 104 may be configured to heat gas that is communicated to reactor 106. In some implementations, heater 104 may comprise one or more valves configured to control the flow of the first gas within heater 104.

In some implementations, heater 104 may comprise a control unit 130 configured to control flow of gas to one or both of reactor 106 or heating component(s) 112. Valves may be used to control a rate of flow of gas from gas source 102 to heater 104. In some implementations, one or more valves may be used to control a rate of flow of gas from gas source 102 to heating component(s) 112. In some implementations, a first portion of gas provided by gas supply 102 may be provided to heater 104. A second portion of that gas may be delivered by gas source 102 to be burned as an energy source for heating component(s) 112 (not shown). In some implementations, the gas may be heated in heater 104 beyond a critical point of the gas so that the gas is in a super critical state.

Figure 2:
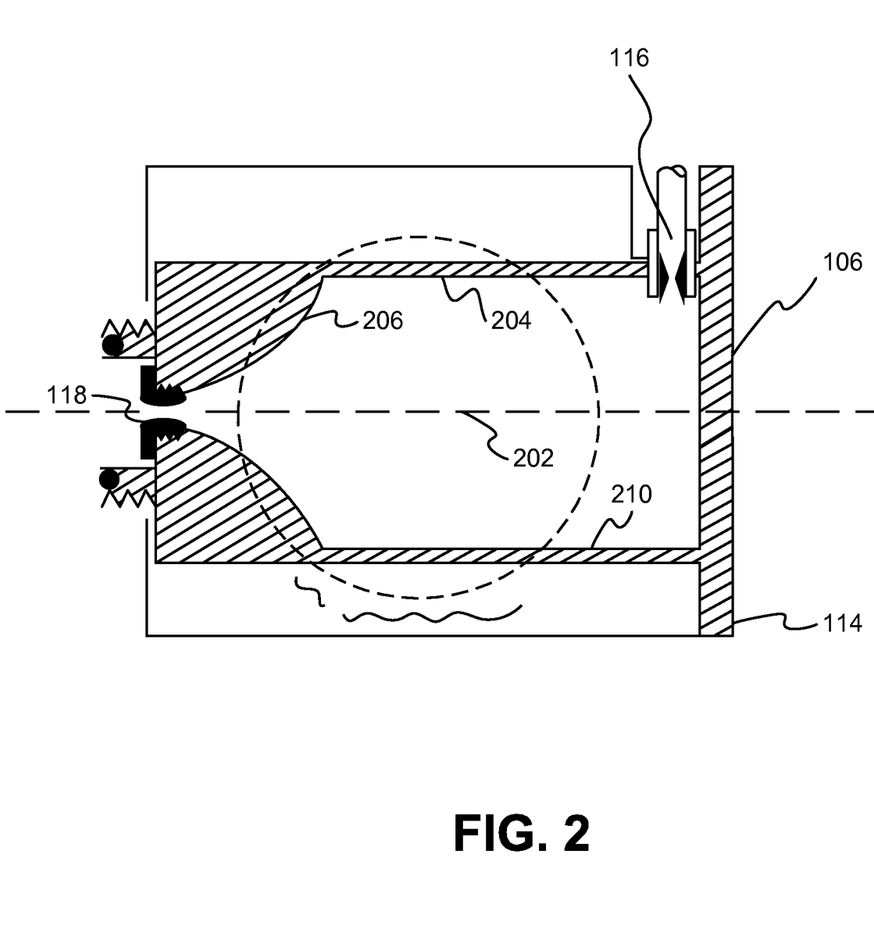
FIG. 2 illustrates a top view of the reactor, in accordance with one or more implementations.
Figure 3:
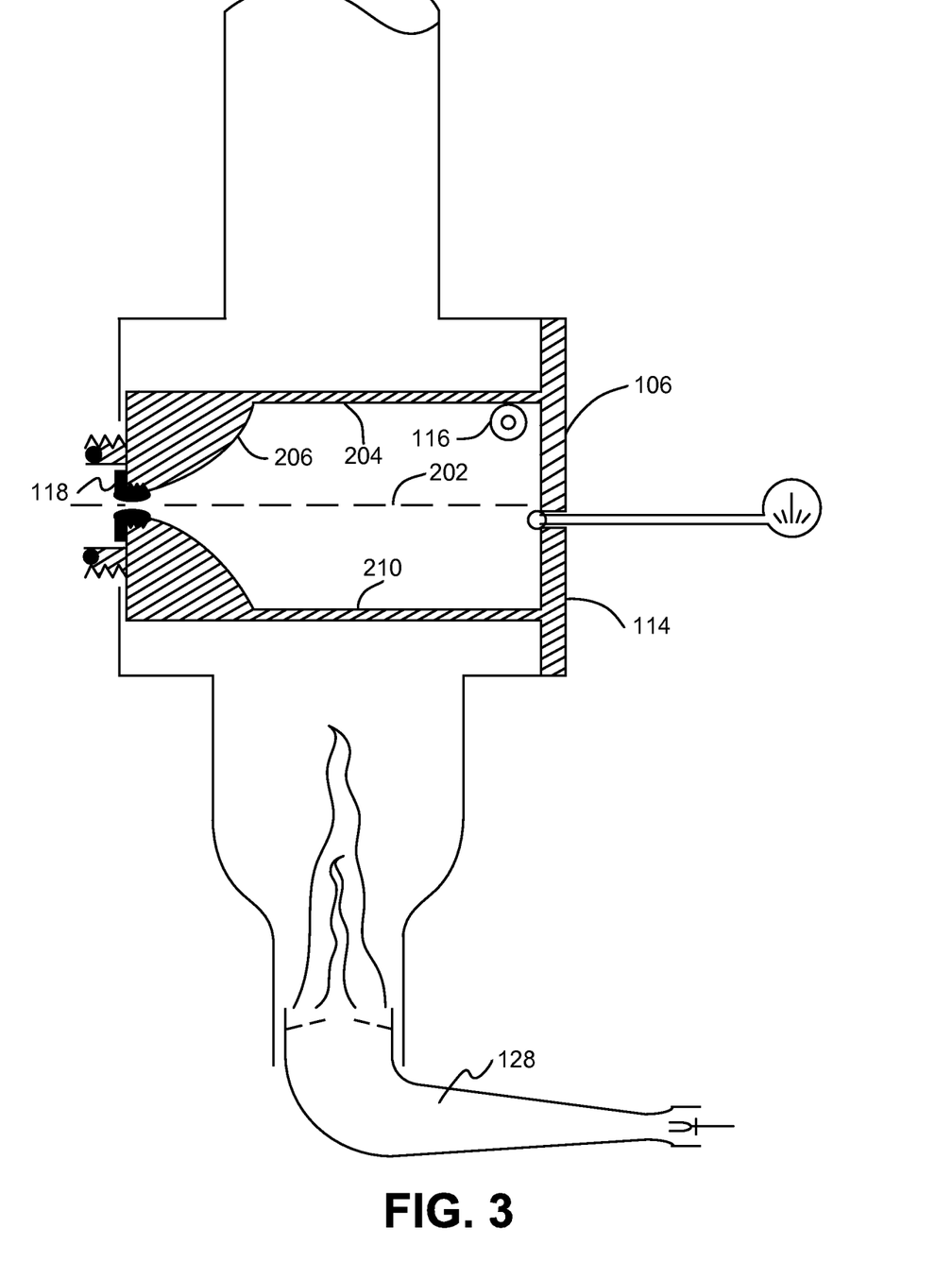
FIG. 3 illustrates a side view of the reactor, in accordance with one or more implementations.
Figure 4:
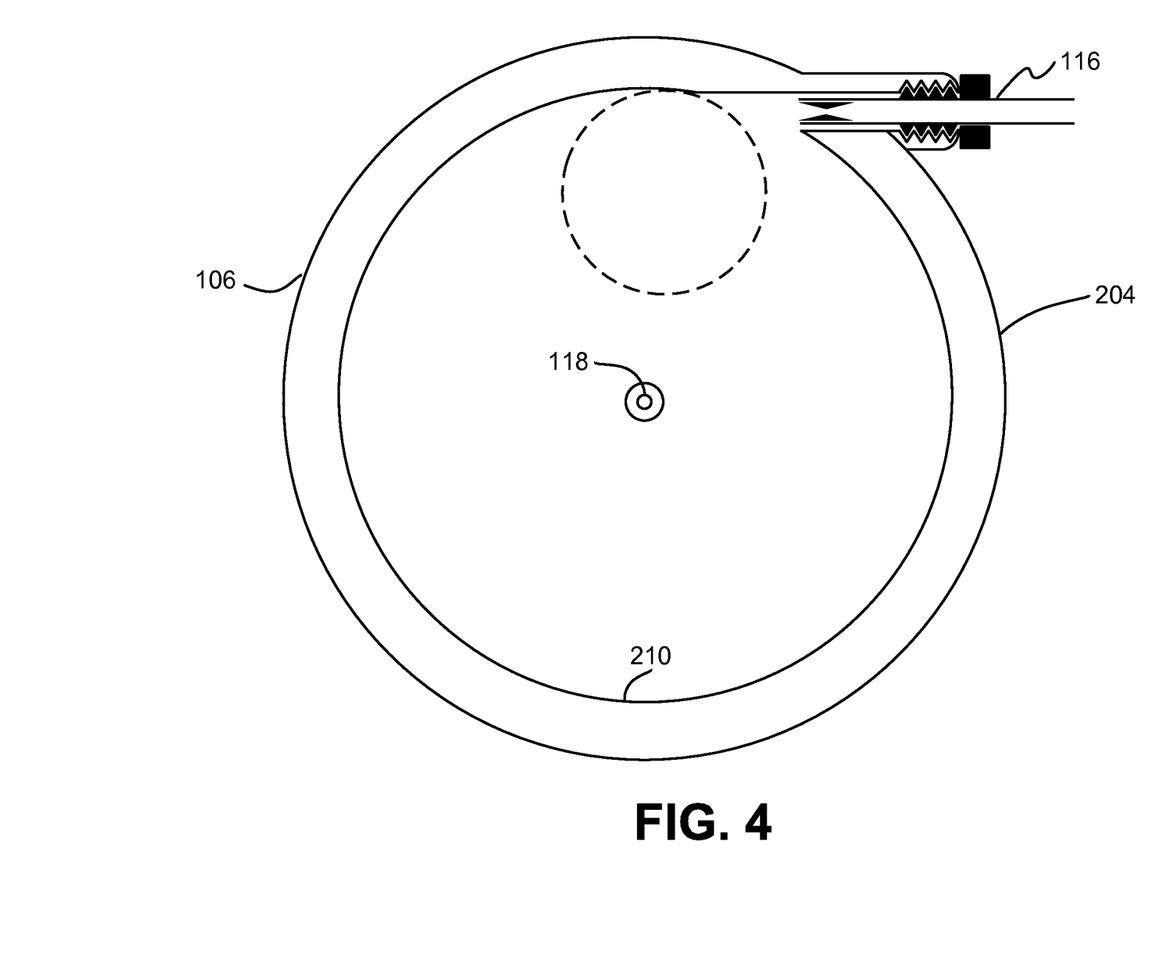
FIG. 4 illustrates a rear view of the reactor, in accordance with one or more implementations.

FIGS. 2, 3, and 4 respectively illustrate a top view, a side view, and a rear view of reactor 106, in accordance with one or more implementations. The reactor 106 may include a chamber 114 centered on a longitudinal axis 202 that is normal to the cross-section. In some implementations, a portion 204 of the chamber 114 may be shaped as a cylinder. A radius of the substantially circular cross-section of a portion 206 of chamber 114 may continuously decrease at an end of the chamber 114 proximal to outlet 118. The portion 206 of chamber 114 having the continuously decreasing radius of the substantially circular cross-section may be shaped as a cone, a hemisphere, a horn-shape (see, e.g., FIGS. 2 and 3), and/or other shapes.

The chamber 114 may be formed of various materials. The chamber 114 may be formed of a ridged material. The chamber 114 may be formed of a thermally conductive material. The chamber 114 may be formed of an electrically conductive material. According to some implementations, chamber 114 may be formed wholly or partially of steel, iron, iron alloys, silicon carbide, partially stabilized zirconia (PSZ), fused alumina, tungsten carbide, boron nitride, carbides, nitrides, ceramics, silicates, geopolymers, metallic alloys, other alloys, and/or other materials. In some implementations, an internal surface 210 of chamber 114 may be coated with one or more coatings. An exemplary coating may be configured to prevent physical or chemical wear to internal surface 210 of chamber 114. In some implementations, a coating may be configured to promote a chemical reaction within chamber 114. An example of a coating that may promote a chemical reaction may include one or more of iron; nickel; ruthenium; rhodium; platinum; palladium; cobalt; other transition metals and their alloys, compounds, and/or oxides (e.g., the lanthanide series and their compounds, alloys, and/or oxides); and/or other materials.

The gas inlet 116 may be configured to introduce a high-velocity stream of gas into chamber 114. The gas inlet 116 may be disposed and arranged so as to effectuate a vortex of the stream of gas circulating within chamber 114. The vortex may rotate about longitudinal axis 202 of chamber 114. The gas inlet may be disposed so that the stream of gas is directed substantially perpendicular to longitudinal axis 202 of chamber 114. The gas inlet 116 may be disposed so that the stream of gas is directed substantially tangent to an internal surface of the substantially circular cross-section of the chamber (see, e.g., FIG. 4).

The gas emitted by gas inlet 116 may include any number of gaseous materials. In some implementations, the gas may include a reduced gas, i.e., a gas with a low oxidation number (or high reduction), which is often hydrogen-rich. The gas may include one or more of steam, methane, ethane, propane, butane, pentane, ammonia, hydrogen, carbon monoxide, carbon dioxide, oxygen, nitrogen, chlorine, fluorine, ethene, hydrogen sulphide, acetylene, and/or other gases. The gas may be a vapor. The gas may be superheated. In some implementations, the gas may be heated beyond a critical point, and/or compressed above a critical pressure so that the gas becomes a superheated gas, compressible fluid, and/or a super critical fluid.

Figure 5:
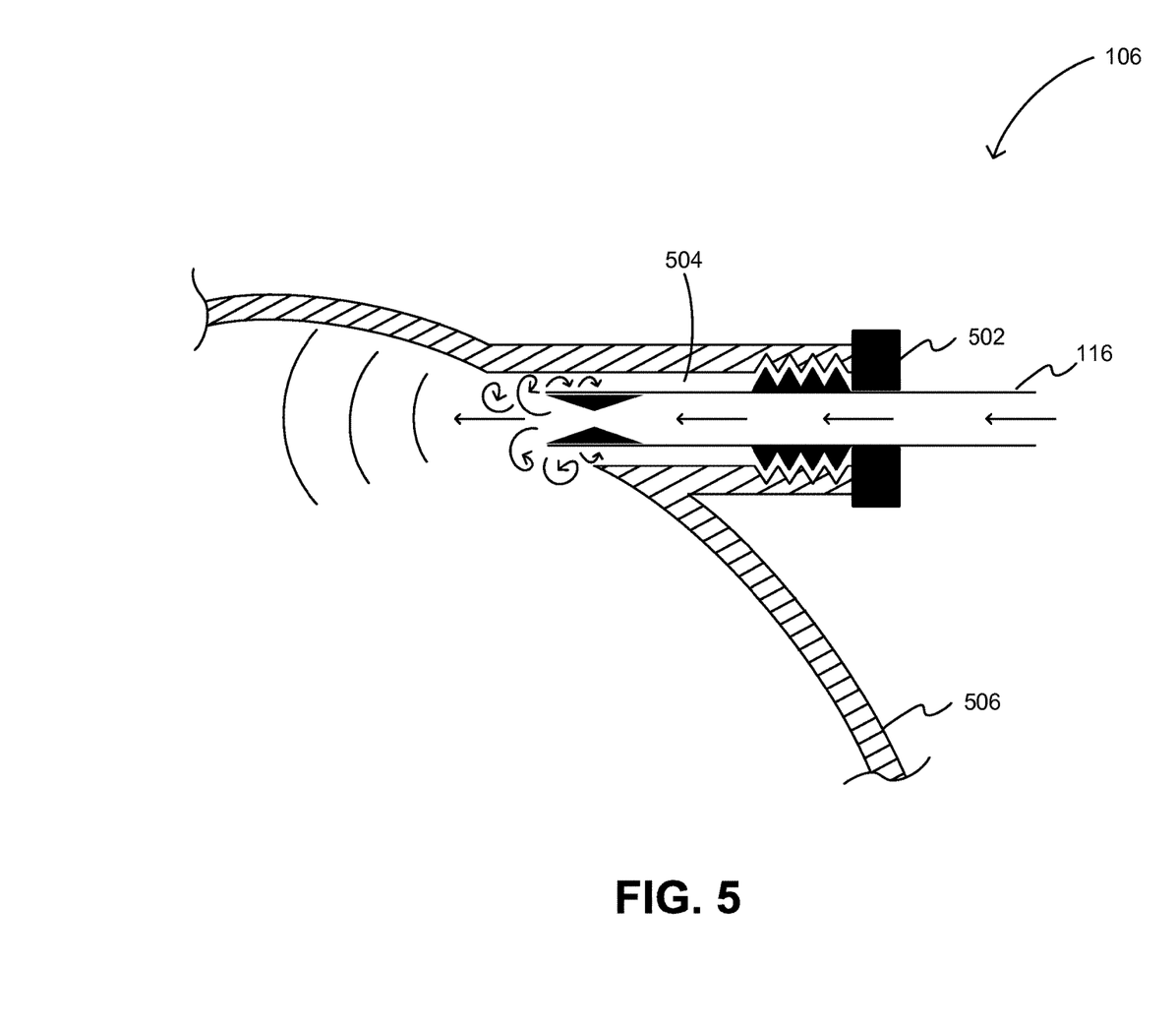
FIG. 5 illustrates a detailed view of a gas inlet of the reactor, in accordance with one or more implementations.

FIG. 5 illustrates a detailed view of a gas inlet 116 of reactor 106, in accordance with one or more implementations. The gas inlet 116 may include an inlet nozzle 502 disposed within gas inlet 116. The inlet nozzle 502 may be configured to be secured in place by screw threads. The inlet nozzle 502 may be configured to accelerate the stream of gas being introduced into chamber 506. In exemplary implementations, inlet nozzle 502 may be configured to emit the stream of gas at a supersonic speed. The inlet nozzle 502 may be configured to emit shock waves in the stream of gas emitted from inlet nozzle 502. The gas inlet 116 may include an annular cavity 504 disposed about inlet nozzle 502. The annular cavity 504 may be configured such that the stream of gas emitted from inlet nozzle 502 resonates within annular cavity 504.

Figure 6:
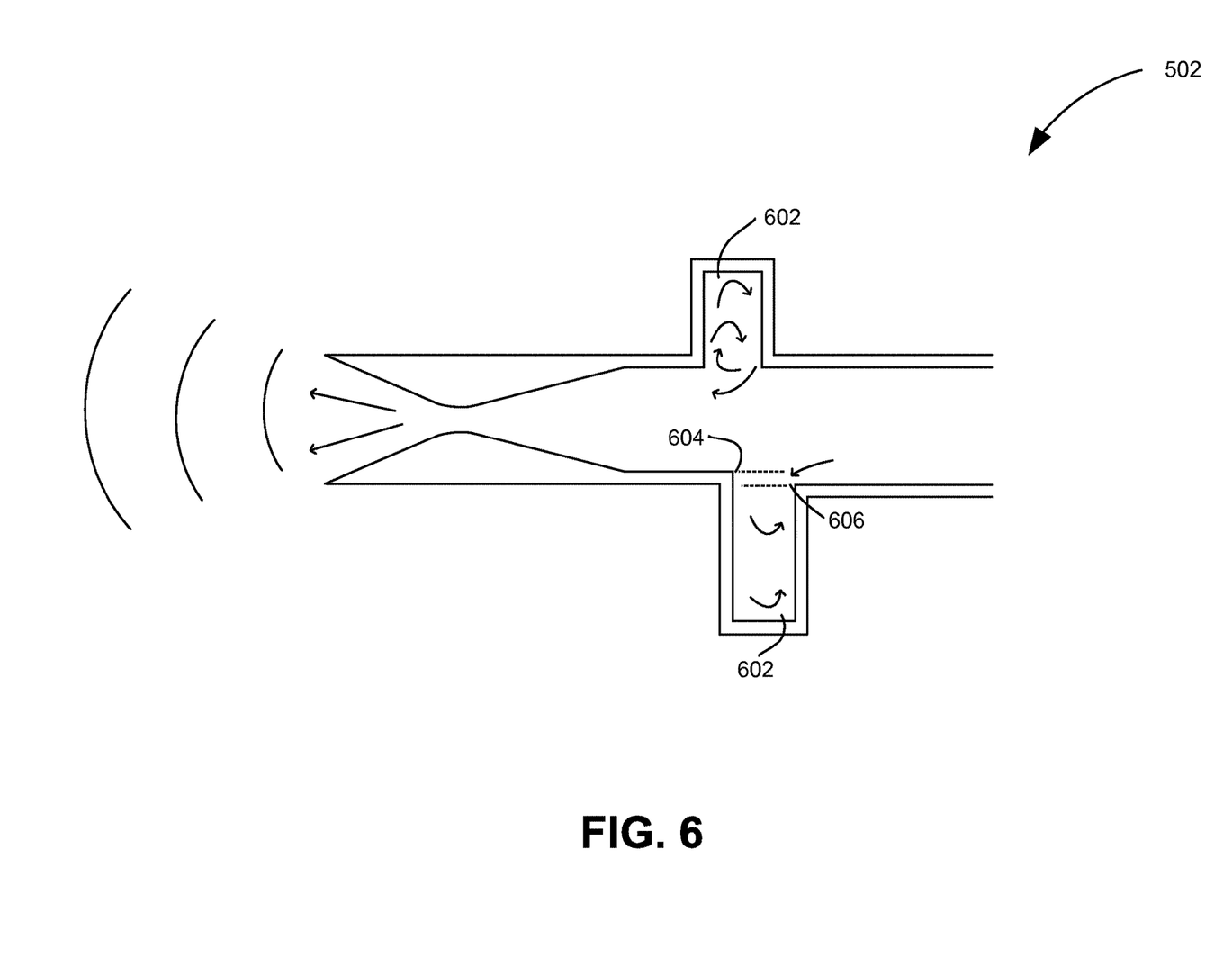
FIG. 6 illustrates a detailed view of an inlet nozzle of the gas inlet, in accordance with one or more implementations.

FIG. 6 illustrates a detailed view of inlet nozzle 502 of gas inlet 116, in accordance with one or more implementations. The inlet nozzle 502 may include one or more resonator cylinders 602. A given resonator cylinder 602 may be disposed within inlet nozzle 502 and may be oriented perpendicular to the main flow of gas through inlet nozzle 502. A given resonator cylinder 602 may be configured such that gas pressure pulses resonate within the given resonator cylinder 602 to induce shock waves within inlet nozzle 502. Shock waves occurring within inlet nozzle 502 may propagate out of inlet nozzle 502 into chamber 114. Different resonator cylinders 602 may have different sizes so that corresponding different resonant frequencies result in shock waves occurring at different frequencies. Offset of a lip 604 relative to another lip 606 of a given resonator cylinder 602 may induce pumping in the given resonator cylinder 602.

According to some implementations, inlet nozzle 502 may be configured to introduce a shockwaves, and/or harmonics in the gas, and/or chamber 114. The inlet nozzle 502 may include one or more of a Hartmann-Sprenger tube, a Hartmann generator, a Hartmann oscillator, a nozzle utilizing one or more electronically controlled piezoelectric or magnostrictive transducers to control the shockwaves, a motorized rotating nozzle similar to a siren, and/or other types of nozzles. A capacitor discharge spark may be used to induce a shockwave. A Hartmann generator may include a device in which shock waves generated at the edges of a nozzle by a supersonic gas jet resonate with the opening of a small cylindrical pipe, placed opposite the nozzle, to produce powerful ultrasonic sound waves. A Hartmann oscillator may include a gas-jet radiator of sonic and ultrasonic waves. The oscillator may include a nozzle from which gas under a pressure $p>0.2$ meganewtons per square meter (1.93 atmospheres) emerges at supersonic speed. In the process, the gas jet may create compression and rarefaction waves. If a resonator is placed in this flow coaxially with the nozzle at a certain distance, sonic and ultrasonic waves may be radiated. The frequency of the acoustic radiation may be a function of the distance between the nozzle and the resonator, as well as the size of the resonator. Hartmann oscillators may radiate up to several dozen watts of acoustic power. If compressed air (from a tank or compressor) is blown through the nozzle, frequencies ranging from 5 or 6 kilohertz up to 120 kilohertz may be obtained. By using hydrogen in place of air, frequencies up to 500 kilohertz may be reached.

Referring again to FIG. 1, system 100 may include a storage system 108. The storage system 108 may include a storage tank 120. Storage tank 120 may be configured to store the output product of reactor 106. The storage tank 120 may be in fluid communication with the outlet 118 of reactor 106. The storage tank 120 may be configured to store products of the reactor 106 as solids, liquids, and/or gases. The storage tank 120 may comprise a port 122 configured to facilitate removal of the output product. The storage tank may comprise a vacuum pump 124 in fluid communication with the storage tank 120. The vacuum pump 124 may be configured to provide a vacuum pressure within the storage tank 120. In some implementations, system 100 may comprise a radiator 126 configured to cool one or more of the vacuum pump 124, the output product, reactor 106, and/or other components. In some implementations, a portion of the output product may be provided to heating component(s) 112 and/or 128 for combustion.

The system 100 may comprise a control unit 130 configured to control one or more of a pressure, a temperature, a rate of flow of a gas, and/or other properties of the gas flow through one or more of heating component(s) 112 and/or 128, the valves, reactor 106, vacuum tank 120, and/or other components. In some implementations, a reactor system 132 may be monitored by control unit 130 to control a rate of flow, temperature, pressure, reaction quality, and/or other properties of reactor system 132. Control unit 130 may control the frequency, amplitude, and/or waveform of the gas flow. A sensor 134 may be configured to provide one or more signals conveying information associated with a pressure, a temperature, a flow rate of a gas, and/or other information within system 100. Sensor 134 may be configured to provide a signal conveying information associated with a temperature of one or more of the heating components 112 and 128, the valves, the heater 104, the gas supply 102, reactor 106, the vacuum tank 120, and/or other components of system 100. Sensor 134 may be placed in several locations within system 100. The position of sensor 134 within reactor 106 in FIG. 1 is illustrative only and is not intended to be limiting. The illustration in FIG. 1 only depicts one sensor for clarity purposes and is not intended to be limiting. More than one sensor may be used in a variety of positions throughout system 100, in some implementations. In some implementations, control unit 130 may be configured to control a flow rate of the first gas based on information associated with a pressure, a temperature, a flow rate of a gas, and/or other information within system 100 based on information from sensor 134.

Some features of system 100 may be the same as or similar to one or more features described in U.S. patent application Ser. No. 14/298,868 filed on Jun. 6, 2014 (now U.S. Pat. No. 9,050,604 issued on Jun. 9, 2015) and entitled "Reactor Configured to Facilitate Chemical Reactions and/or Comminution of Solid Feed Materials"; U.S. patent application Ser. No. 14/298,877 filed on Jun. 6, 2014 (now U.S. Pat. No. 9,724,703 issued on Aug. 8, 2017) and entitled "System and Methods for Processing Solid Materials Using Shockwaves Produced in a Supersonic Gaseous Vortex"; and/or U.S. patent application Ser. No. 14/690,111 filed on Apr. 17, 2015 (now U.S. Pat. No. 9,452,434 issued on Sep. 27, 2016) and entitled "Providing Wear Resistance in a Reactor Configured to Facilitate Chemical Reactions and/or Comminution of Solid Feed Materials using Shockwaves Created in a Supersonic Gaseous Vortex"; which are incorporated by reference.

Figure 7:
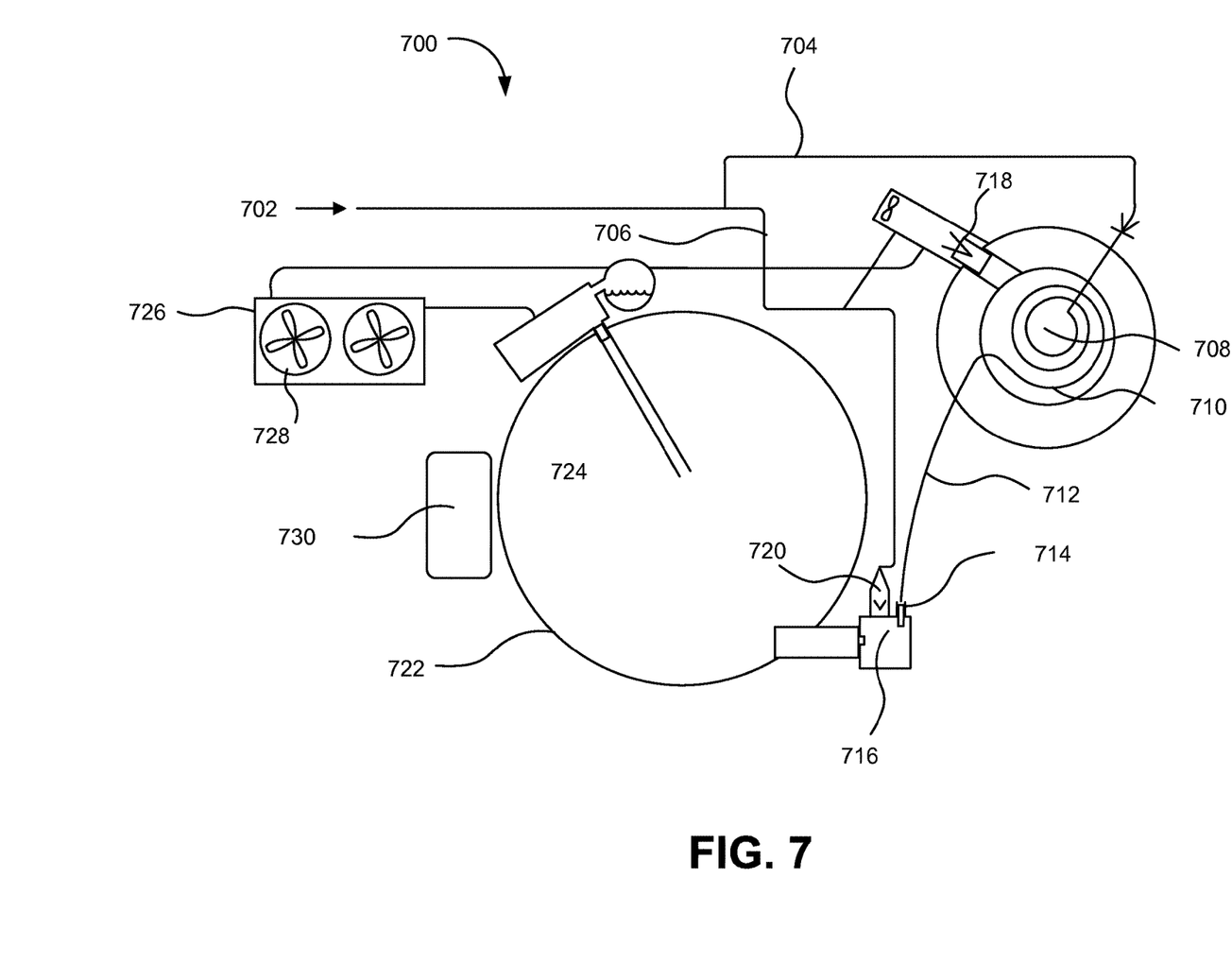
FIG. 7 illustrates an exemplary implementation of the system of FIG. 1.

FIG. 7 illustrates an exemplary implementation 700 of system 100. Implementation 700 may include a gas line 702. In some implementations, the gas line 702 may receive gas from a source that is the same as or similar to gas source 102. In implementation 700, gas line 702 may be divided into two flow paths 704 and 706. In some implementations, the two flow paths 704 and 706 may respectively carry a first portion of the flow of gas and a second portion of gas. For example, flow path 704 may carry a first portion of gas through a heater 708 and reactor 716 to be reacted. Flow path 706 may carry a second portion of gas to be combusted in heating element(s) 718 and/or 720. The gas in path 704 may pass through heater 708. The conduit may be coiled 710 to enhance heat transfer. In some implementations, heater 708 may be the same as or similar to heater 104. The heater outlet 712 may be in gas communication with reactor inlet 714. In some implementations, reactor 716 may be the same as or similar to reactor 106. The heated or super-heated gas may enter reactor 716 through a nozzle (not depicted) within reactor 716 inlet 714. The heating element(s) 720 may be configured and arraigned to raise the temperature of one or more of heater 708, reactor 716, and/or other components of system 100.

In some implementations, reactor 716 may be in fluid communication with storage tank 722. A vacuum pump 724 may be used to remove reactor products of the reaction within reactor 716 or storage tank 722. A radiator 726 with one or more fans 728 may be used to cool one or more of the reactants, products, storage tank 722, vacuum pump 724, and/or other components of system 100. In some implementations, a controller 730 may be configured to receive information from one or more sensors and/or other measuring devices. Controller 730 may be configured to control one or more valves and/or other components within system 100 based on the information obtained from the sensor(s), and/or other measuring device(s).

Figure 8:
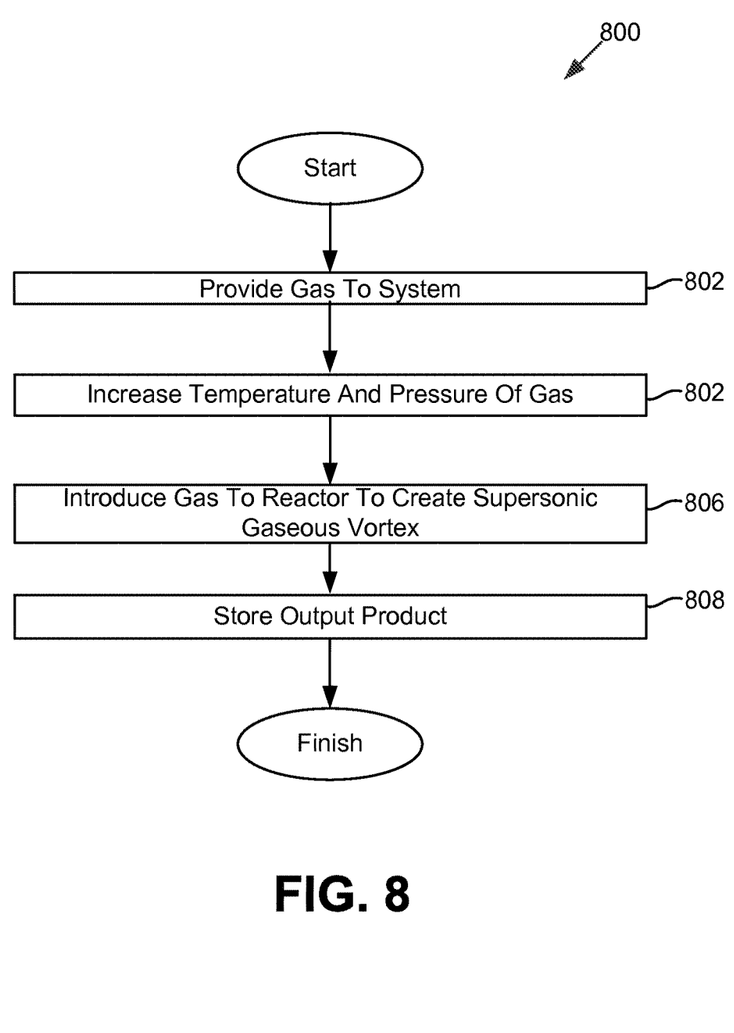
FIG. 8 illustrates a method for facilitating reactions in gases using shockwaves produced in a supersonic gaseous vortex, in accordance with one or more implementations.

FIG. 8 illustrates a method for facilitating reactions in gases using shockwaves produced in a supersonic gaseous vortex, in accordance with one or more methods. The operations of method 800 presented below are intended to be illustrative. In some embodiments, method 800 may be accomplished with one or more additional operations not described, and/or without one or more of the operations discussed. Additionally, the order in which the operations of method 800 are illustrated in FIG. 8 and described below is not intended to be limiting.

In some implementations, one or more steps of method 800 may be implemented using one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 800 in response to instructions stored electronically on an electronic storage medium. The one or more processing devices may include one or more devices configured through hardware, firmware, and/or software to be specifically designed for execution of one or more of the operations of method 800.

At a step 802, a gas may be provided to the system. In some implementations, step 802 may be performed by a gas source 102 configured to provide one or more gases to system 100.

At a step 804, the temperature and the pressure of the gas may be increased. In some implementations, step 804 may be performed by heater 104 and one or more heating components 112 of system 100.

At a step 806, the gas may be introduced to a reactor to create a supersonic gaseous vortex. Chemical reactions of gases may be catalyzed using the shockwaves created in the supersonic gaseous vortex. In some implementations, the reactor may comprise a rigid chamber having a substantially circular cross-section centered on a longitudinal axis that is normal to the cross-section. In some implementations, the reactor may comprise a gas inlet configured to introduce the high-velocity stream of a gas into the chamber. In some implementations, the gas inlet may be disposed and arranged so as to effectuate a vortex of the stream of gas circulating within the chamber. The vortex may be rotating at a supersonic speed about the longitudinal axis of the chamber. Step 806 may be performed in chamber 114 of reactor 106, in some implementations.

At a step 808, the output product may be stored at an outlet 118 configured to emit output product from chamber 114. In some implementations, outlet 118 may be disposed at an opposite end of chamber 114 as gas inlet 116. In some implementations, outlet 118 may be used to store the output product. Step 808 may be performed by storage system 108, in some implementations.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system configured for facilitating reactions in gases using shockwaves produced in a supersonic gaseous vortex, the system comprising:
   a gas source configured to provide one or more gases including a first gas to the system;
   a heater configured to receive the first gas from the gas source, and increase a temperature and pressure of the first gas;
   a reactor configured to facilitate chemical reactions of gases using shockwaves created in a supersonic gaseous vortex, the reactor comprising:
      a rigid chamber having a substantially circular cross-section centered on a longitudinal axis that is normal to the cross-section, wherein the chamber is shaped as a cylinder;
      a gas inlet configured to introduce a high-velocity stream of the first gas into the chamber, the gas inlet being disposed and arranged so that a stream of gas is directed substantially tangent to an internal surface of the substantially circular cross-section of the chamber and so as to effectuate a vortex of the stream of gas circulating within the chamber, the vortex rotating at a supersonic speed about the longitudinal axis of the chamber, wherein the gas inlet comprises a nozzle and a shockwave generation structure configured to generate shockwaves at the edges of the nozzle by a supersonic gas jet resonating with the opening of a cylindrical pipe positioned opposite the nozzle, to produce ultrasonic sound waves, wherein the shockwave generation structure comprises a capacitor discharge;
      an outlet configured to emit output product from the chamber, the outlet being disposed at an opposite end of the chamber as the gas inlet, wherein the outlet is tapered; and
   a storage tank configured to store the output product of the reactor, the storage tank being in fluid communication with the outlet of the reactor.

2. The system of claim 1, wherein the first gas introduced to the reactor gas inlet includes a reduced gas.

3. The system of claim 1, wherein the first gas includes one or more of steam, methane, ethane, ethene, propane, butane, pentane, hexane, alkyl isomers, unsaturated hydrocarbons, cycloalkanes, aromatic hydrocarbons, ammonia, hydrogen, hydrogen sulfide, carbon monoxide, carbon dioxide, oxygen, nitrogen, chlorine, fluorine, or acetylene.

4. The system of claim 1, wherein the first gas is heated beyond a critical point of the gas so that the gas is in a supercritical state.

5. The system of claim 1, wherein a shape of the reactor is configured to accelerate a speed of the gaseous vortex.

6. The system of claim 1, wherein the gas inlet is disposed so that a stream of gas is directed perpendicular to the longitudinal axis of the chamber.

7. The system of claim 1, wherein the gas inlet includes an inlet nozzle disposed within the gas inlet, the inlet nozzle being configured to emit the stream of gas at a supersonic speed, or wherein the inlet nozzle is configured to emit shockwaves in the stream of gas emitted from the inlet nozzle.

8. The system of claim 7, wherein the inlet nozzle includes one or more of a Hartmann-Sprenger tube, a Hartmann generator, or a Hartmann oscillator.

9. The system of claim 1, wherein the outlet is disposed on the longitudinal axis of the chamber, wherein the outlet includes an outlet nozzle disposed within the outlet, the outlet nozzle being configured to pressurize the chamber.

10. The system of claim 1, wherein the outlet nozzle is configured to effectuate a rapid cooling of processed material exiting the reactor.

11. The system of claim 1, wherein the gas inlet is disposed such that the stream of gas is directed tangentially to an internal surface of the chamber.

12. A method of facilitating reactions in gases using shockwaves to provide a supersonic gaseous vortex, the method comprising:
    providing one or more gases including a first gas to the system;
    increasing a temperature and pressure of the first gas;
    introducing the first gas to a reactor to create a supersonic gaseous vortex wherein chemical reactions of gases are catalyzed using shockwaves created in a supersonic gaseous vortex, the reactor comprising:
       a rigid chamber having a substantially circular cross-section centered on a longitudinal axis that is normal to the cross-section, wherein the chamber is shaped as a cylinder;
       a gas inlet configured to introduce a high-velocity stream of the first gas into the chamber, the gas inlet being disposed and arranged so that a stream of gas is directed substantially tangent to an internal surface of the substantially circular cross-section of the chamber, and so as to effectuate a vortex of the stream of gas circulating within the chamber, the vortex rotating at a supersonic speed about the longitudinal axis of the chamber, wherein the gas inlet comprises a nozzle and a shockwave generation structure configured to generate shockwaves at the edges of the nozzle by a supersonic gas jet resonating with the opening of a cylindrical pipe positioned opposite the nozzle, to produce ultrasonic sound waves, wherein the shockwave generation structure comprises a capacitor discharge;
       an outlet configured to emit output product from the chamber, the outlet being disposed at an opposite end of the chamber as the gas inlet, wherein the outlet is tapered; and
    storing the output product.

13. The method of claim 12, wherein the first gas introduced to the reactor gas inlet includes a reduced gas.

14. The method of claim 12, wherein the first gas includes one or more of steam, methane, ethane, ethene, propane, butane, pentane, hexane, alkyl isomers, unsaturated hydrocarbons, cycloalkanes, aromatic hydrocarbons, ammonia, hydrogen, hydrogen sulfide, carbon monoxide, carbon dioxide, oxygen, nitrogen, chlorine, fluorine, or acetylene.

15. The method of claim 12, wherein the first gas is heated beyond a critical point of the gas so that the gas is in a supercritical state.

16. The method of claim 12, wherein a shape of the rigid chamber is configured to accelerate a speed of the gaseous vortex.

17. The method of claim 12, wherein the first gas is disposed so that a stream of gas is directed perpendicular to the longitudinal axis of the chamber.

18. The method of claim 12, wherein the gas inlet is configured to emit the stream of gas at a supersonic speed, or wherein the gas inlet is configured to emit shockwaves in the stream of gas.

19. The method of claim 18, wherein the gas inlet includes one or more of a Hartmann-Sprenger tube, a Hartmann generator, or a Hartmann oscillator.

20. The method of claim 12, wherein the outlet is disposed on the longitudinal axis of the chamber, and wherein the outlet includes an outlet nozzle disposed within the outlet, the outlet nozzle being configured to pressurize the chamber.

21. The method of claim 12, wherein the outlet nozzle is configured to effectuate a rapid cooling of processed material exiting the reactor.

22. The method of claim 12, wherein the first gas is designed to impinge on a catalytic surface, the catalytic surface including catalytic action and/or electrically induced NEMCA affect.

* * * * *